WHEELER & EVANS.
Alcohol Still.
No. 102,633.
Patented May 3, 1870.
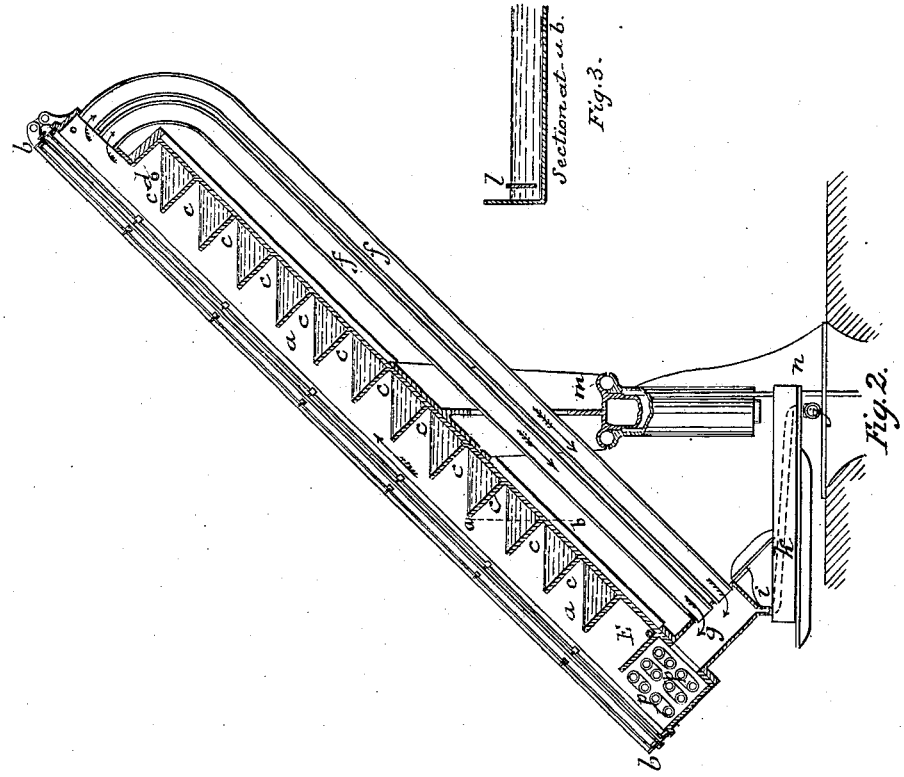
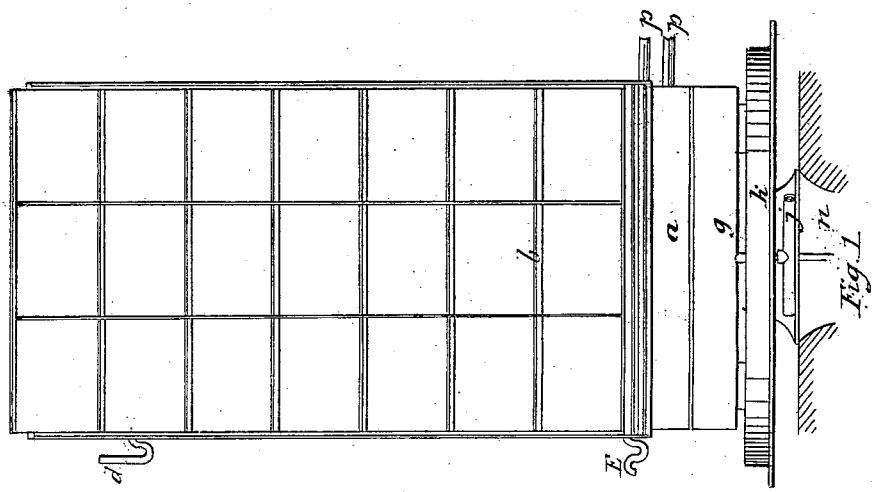

UNITED STATES PATENT OFFICE.

NORMAN W. WHEELER, OF BROOKLYN, AND WALTON W. EVANS, OF NEW ROCHELLE, NEW YORK.

IMPROVEMENT IN EVAPORATING AND DISTILLING BY SOLAR HEAT.

Specification forming part of Letters Patent No. 102,633, dated May 3, 1870.

*To all whom it may concern:*

Be it known that we, NORMAN W. WHEELER, of the city of Brooklyn, county of Kings, and WALTON W. EVANS, of the town of New Rochelle, county of Westchester and State of New York, have invented a new and useful Method of Distillation; and we do hereby declare that the following is a full and exact description of the apparatus pertaining thereto, and the operation thereof, reference being had to the accompanying drawings making a part of this specification, in which—

Figure 1 is a front elevation, Fig. 2 a sectional elevation, and Fig. 3 a section, to illustrate the construction of important parts.

This invention is based upon well-known physical laws, viz:

Heat radiated from a luminous body—that is to say, luminous heat—will pass through moderately moist air, or through glass of moderate thickness, with very little loss or change.

Heat radiated from a non-luminous body—that is to say, obscure heat—is in great part arrested and absorbed by the same kind of air or glass.

Air and other gases tend to rise when heated, and to fall when cold.

The capacity of air and other gases for the vapors of all or many of the liquids is increased by heat and decreased by refrigeration.

When water or other liquid is vaporized the chief parts of the salts or other like impurities held in suspension or solution remain behind, and the liquid resulting from the condensation of such vapor is comparatively pure.

To put our invention into practice, we inclose a space, as the box *a*, making the box of wood, metal, or other suitable material, and covering the open top with a sash, *b*, having panes of glass set therein in the usual way, preferring that there be more than one sash, so arranged that there shall be air-spaces between the contiguous panes of glass, to prevent, in a measure, the loss of heat by conduction through the glass.

In the bottom of the box *a* we form or place one or more troughs, *c c c*, to hold the liquid to be distilled, and arrange the troughs so that, when the box *a* is placed at the proper angle and position to receive the sun's rays through the glass, the liquid will lie quietly in the troughs, and in such position that they may be filled or replenished through the pipe *d*, which will deliver the liquid into the upper trough, and, after that is filled, any further supply will run over into the one next below, and so on until all are filled except the lower trough, which is fitted with the waste-pipe E, with the view of conducting away any surplus of impure liquid, and so preventing its mingling with the purer distilled liquid in the receptacle below.

To the upper part of the box *a*, and to the small extension *g* of the same, at the lower part, we attach a series of tubes, *f f*, preferably of tin or other not easily oxidized metal, in such a way that both ends of each tube will open into the inclosed space, and allow a downward movement of air or gas from the upper to the lower parts of the inclosed space.

We prefer to make the troughs *c c c* each with an imperfect diaphragm, *l*, Fig. 3, in some part of it, and to so arrange the pipe *d*, and the places of overflow from one trough to another, that any liquid flowing in will fall into a small compartment, fill the trough through the opening in the diaphragm, and the overflow pass on without mixing with the main body in the trough, to prevent the cooling of the liquid in the upper troughs by the fact of replenishing the liquid in the lower ones.

The box *a* and its appurtenances are mounted by the bracket *m* upon the standard *n*, in such a way that the face or sash may be turned from time to time toward the sun, or be moved about by automatic machinery.

The standard *n* we prefer to have cut away beyond the center line or axis of the pin of the bracket *m*, so as to allow of a collecting-pipe, *j*, being laid along in the axial lines of the turning-pins of a row of stills, to which will lead the pipe *i* from each still to carry off the distilled liquid from the small box *g*, and deliver it into the collecting-pipe *j*, and still allow a sufficient turning movement of the box *a*.

As a matter of convenience, we attach to each still a segment, $k$, to which may be fastened a rope or chain, in such a way that all the stills in a row may be attached to the chain or rope, and the whole turned about at once by windlasses or other suitable appliance.

The operation of this apparatus is as follows:

The troughs $c\ c\ c$ having been filled through the pipe $d$, or otherwise, and the still turned to face the sun, in clear weather the luminous rays pass through the glass and impinge upon the surface of the liquid in the troughs, or upon the material of the troughs, that part which is reflected from the liquid surfaces being directed chiefly upon the lower sides of the troughs next above.

This impingement of luminous heat upon dark surfaces changes it into obscure heat, and renders it incapable of being radiated back through the glass, except in small quantity, so that it remains within the box $a$, and raises the temperature of the liquid and gases therein contained, which increase of temperature induces a movement of the air or gases toward the upper part of the box $a$, and this, in turn, induces a downward movement through the pipes $ff$.

These pipes are herein shown freely exposed to the air, and any excess of heat contained in the downward current of air or gases will be, in great part, transferred by conduction to the outer air.

Hence, heat being continually received through the glass and continually escaping through the tubes $ff$, a continuous current of warm air or gas rises upward through the box $a$, and a continuous current of air or gas descends through the pipes $ff$, which is cooled as it flows, all in the directions indicated by the arrows in the drawing.

This gaseous current, passing into the lower end of the box $a$ at a lower temperature than that at which it passes out at the upper end, has its capacity for vapor constantly increased as it ascends, and as its heat is increased, while, during its passage downward through the tubes $ff$, its capacity for vapor is constantly decreased by reason of its progressive lowering of temperature.

Hence, the gaseous current takes up vapor from the liquid exposed to its action in the troughs $c\ c\ c$, and deposits it by condensation in the tubes $ff$, from which it flows into the receptacle $g$, and off through the pipes $i$ and $j$.

The tubes $ff$ may be readily cooled by inclosing them in a separate box and surrounding them with water, by sprinkling them, or by incasing them in a box open at the lower end, and continued upward as a chimney, to induce a strong current of cooling air among the tubes, or even by an artificial blast of air, and thus the effectiveness of the machine be increased within certain limits.

We have found, by a series of experiments, that when water is distilled, the cooling action should be limited, as a great difference in temperature, and low absolute heat in the box $a$, are not so effective as a less difference and greater general heat in the box $a$, which may be accounted for by the fact that the capacity of air or gas for vapor augments in a higher ratio than the augmentation of its heat.

For instance, when the heat of the water in the troughs $c\ c\ c$ was 90° Fahrenheit, and the heat within the tubes $ff$, 40° Fahrenheit, the distillation proceeded very slowly, while, with the water heated to 130°, and with the tubes $ff$ at 90°, the distillation was very rapid.

Alcohol and other liquids, which boil at lower temperature than water, are readily distilled at a lower heat than above indicated.

For instance, the spirit may be distilled from a fermenting mash, wash, or must, of grapes or other fruit, without heating it above the proper fermenting temperature, and, hence, the process may be carried on during the fermentation, and until very nearly the whole of the spirit-making constituents of the fermenting material are exhausted, without allowing any part to advance to the acetous fermentation, and without heat sufficient to destroy the essential oils which constitute the flavors and aromas of vinous spirits.

When the object is to procure fresh and pure water from salt, alkaline, or otherwise impure sources, the still may be allowed to act through the day, and cease operations during the night, in which case the distillation goes on during a great part of the night, for the reason that, when the sun ceases to act upon the water in the troughs $c\ c\ c$, the heat contained therein seeks to diffuse itself through a larger space, but the sides of the box $a$ being made of non-conducting material, and there being a layer of non-conducting air between the panes of glass, the readiest way for the escape of heat is by the continued evaporation and cooling through the tubes $ff$, until the differential temperature disappears, and the heat of the water in the troughs $c\ c\ c$ is not much greater than that of the surrounding air.

But, when spirit is being distilled from a fermenting mixture, this nightly cooling would be disastrous, because complete fermentation occupies a longer time than one day, and the action is arrested by a lower temperature than about 80° Fahrenheit.

This can be prevented by covering the cooling-surfaces with matting, or other good non-conducting material, or the distillation may be carried steadily on during nights, or cloudy weather, by means of artificial heat applied to the gases within the box $a$.

To this end we fit into the lower part of the box $a$ the pipes $p\ p$, in such a way that the gases within will impinge upon them and connect them with a body of water or air heated by a fire, and made to circulate through them. This will induce the proper currents, and cause the distillation to proceed as before described.

In stills designed to operate solely by artificial heat, the glass and sashes $b\,b$ may be dispensed with, and the box $a$ made solid, in which case the still may be properly fixed in place.

In the course of experiments made with a view of perfecting our invention, we have placed sponge and other porous material in the troughs $c\,c\,c$, which projected above the surface of the liquid, and raised it by capillary attraction, thus presenting a great area of moist surface to the action of the gaseous currents, and have sought to prevent a supposed loss of heat by the reflection of luminous rays back through the glass from the liquid surfaces, by means of covers of dark-colored fabric, and of charcoal-dust.

These devices produced an apparent small gain, but we are inclined to believe that reflected luminous heat does not pass readily through glass, and is in a state intermediate between luminous heat proper and obscure heat.

At all events, we found that, under ordinary circumstances, the gas or air in the upper part of the apparatus was saturated with vapor, or so nearly saturated that the passage of a small cloud which would obscure the sun but a few minutes, or seconds in some cases, would cause dew to be deposited upon the under sides of the upper panes of glass in the interior sash, which would obstruct the entrance of luminous heat for a considerable time after the cloud had passed away.

A good way to prevent loss by reflection from the liquid surfaces is to interpose between the troughs $c\,c\,c$ and the glass, a sheet or sheets of wire-cloth, care being taken not to use an easily oxidizable metal, for the air within the box $a$ seems to be ozonized, and attacks metals with great avidity. When distilling from a fermenting mixture, however, the air is soon expelled by the carbonic acid evolved, and oxidation ceases.

It is believed that, when distillation is carried on in an atmosphere of carbonic-acid gas, or any mixture of gases not containing free oxygen, fusil and other deleterious oils usually found in spirits are carried over to a very small extent.

We claim as our invention—

1. The arrangement of the imperfect diaphragms $l$ in the troughs $c\,c\,c$, substantially as and for the purpose described.

2. The combination and mounting of the distilling apparatus herein described, with and upon the bracket $m$ and standard $n$, substantially as and for the purpose described.

3. The combination of the segment K, or its equivalent, with the above-described apparatus, substantially as and for the purpose described.

4. The combination of the box $a$ with the pipes $i$ and $j$, or their equivalents, substantially as and for the purposes described.

5. The combination of the sash $b\,b$, box $a$, troughs $c\,c\,c$, and tubes $f\,f$, or their equivalents, substantially as and for the purposes described.

6. The combination of the pipes $d$ and E, with the troughs $c\,c\,c$, or their equivalents, substantially as and for the purposes described.

7. The combination of the pipes $p\,p$ with the troughs $c\,c\,c$ and tubes $f\,f$, or their equivalents, substantially as and for the purpose described.

8. The method herein described for distilling liquids by means of solar or artificial heat, through the instrumentality of gaseous currents, substantially in the manner and with the apparatus herein described, or the equivalent thereof.

NORMAN W. WHEELER.
W. W. EVANS.

Witnesses:
JOHN R. GILLISS,
FRED. H. COLES.